Patented July 28, 1931

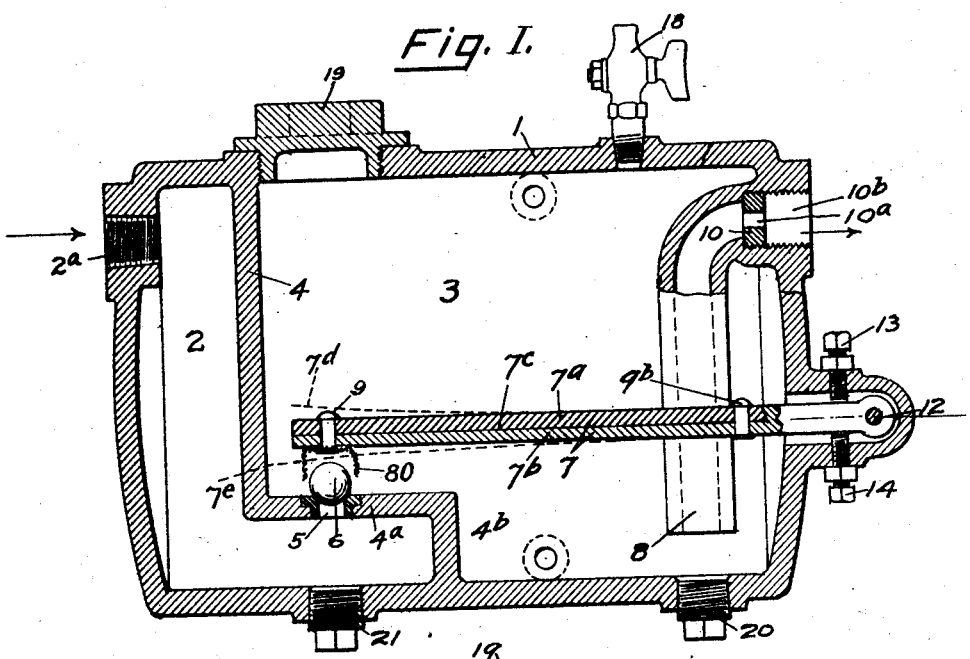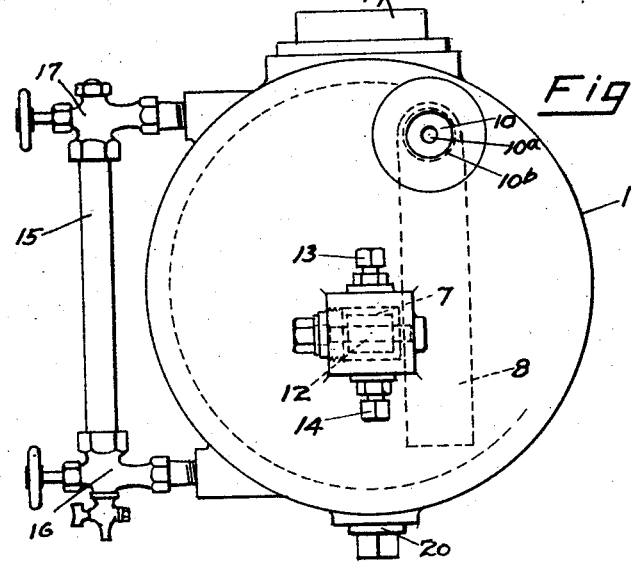

1,816,541

UNITED STATES PATENT OFFICE

GEORGE F. McDOUGALL, OF PORTLAND, OREGON

STEAM TRAP

Application filed August 4, 1930. Serial No. 472,918.

My invention is related to that class of appliances, the purpose of which is to relieve heating systems, pipe lines and such like containing steam under pressure from the water that results from condensation of the steam and instead of being controlled by a float device, its operation is regulated and controlled by temperature changes in the substance to be discharged.

The following drawings accompany and form a part of this specification and illustrate by graphic representation the various figures referred to in the text.

Fig. I is a longitudinal sectional elevation of my new trap showing the interior arrangement of construction; and Fig. II is an end view of the right hand end of Fig. I.

The trap body, 1, is in the form of a hollow shell shown here to be substantially a cylinder having a length somewhat greater than the diameter, though wide variations in this construction are possible.

Interiorly of the shell there are two chambers, the high pressure chamber, 2, which will be drectly connected to the system of piping or the like to be drained, the connection being made at the inlet, 2a, and a low pressure chamber, 3, occupying an adjacent portion of the interior of the shell. A partition, 4, the different portions of which are designated 4a and 4b, constitute a complete closure between the two chambers, 2 and 3, except for a valve opening, 5, which is controlled by a voluntary type valve, 6, which in turn is influenced by the thermostatic bar, 7, construction details of which are hereinafter given.

An outlet for the low pressure chamber, 3, is provided by the siphon pipe, 8, which communicates with the outlet opening, 10b, by means of the disc, 10.

The disc, 10, will have an opening, 10a, the cross-sectional area of which is always less than the cross-sectional area of the valve opening, 5.

The thermostatic bar, 7, is made up of two metals having different degrees of expansibility under the influence of temperature changes. For example, such as brass and untempered steel. And many different forms of construction other than that shown will be available to utilize the principle. In this case, 7a will be considered to be brass and 7b, untempered steel. The axis of the thermostatic bar, 7c, is here shown to be a straight line, though it will be understood that it will be straight only at one temperature and that any cooling off of the bar below that fixed temperature will tend to cause the bar to deflect upward toward the line 7d and any increase in temperature will cause the line to deflect downward toward the line 7e, for the reason that the upper half, 7a, of the thermostatic bar, 7, expands and contracts very much more than the lower half, 7b. This deflection of the thermostatic bar member produces a movement approximately at right angles to the axis of the thermostatic bar that is very much greater than the actual lineal expansion of that part designated 7a, and consequently gives it a greater range of movement for a valve control than it could possibly have were it arranged to simply utilize the lineal expansion of the metal. A cage, 80, is shown attached by the fastening, 9, to the end of the thermostatic bar, 7, to act as a retainer for the valve member, 6, and the thermostatic bar, 7, is shown to be pivoted on the pin, 12, and to be adjustable toward and away from the valve by manipulation of the setscrews 13 and 14, these being shown as a diagrammatic means for securing the desired adjustment while still holding the thermostatic bar 7 rigid in a select position. A gage glass, 15, having gage cocks, 16 and 17, will be in communication with the low pressure chamber, 3, to show the contained water level when a trap is in operation and to assist in securing the proper adjustment of the setscrews 13 and 14. An air cock, 18, is provided to relieve the air from the top of the low pressure chamber, 3, when the trap is placed in service and a plug, 19, is provided so that the interior parts of the device may be placed in position; plugs 20 and 21 being for the purpose of removing scale and sediment on occasion.

In operation the trap will be connected to a system that it is desired to drain and the condensate will flow into the high pressure chamber, 2, lift the valve, 6, from the valve opening, 5, and flow into the low pressure chamber, 3, tending to fill it to the overflow level of the opening, 10a, in the disc 10; and it will continue to do this practically unrestricted by the mechanism of the trap so long as the condensate is substantially cold. As soon as the temperature within the low pressure chamber, 3, rises to a point determined by the adjustment of the thermostatic bar, 7, heat will tend to deflect the end of the bar toward the point designated by the dotted line 7e and effect a closure of the valve, 6, on the valve opening, 5, tending to restrict or interrupt the flow. As soon as this takes place any accumulated pressure in the low pressure chamber, 3, will be relieved through the opening, 10a, of the disc, 10; the water level will tend to drop, the pressure will drop with it and pressure and temperature being functions of each other in steam, the temperature will drop at the same time.

The purpose of making the opening, 10a, of less discharge capacity than the valve opening, 5, is so that the pressure and consequent temperature in the low pressure chamber, 3, can rise above atmosphere and produce a corresponding temperature in the thermostatic bar, 7, to promote quick action upon the valve, 6.

It will be found in operation that the low pressure chamber, 3, will always contain water vapor at greater or less temperature and that the water line of the low pressure chamber should be adjusted by manipulation of the setscrews, 13 and 14, so that it is just below the bottom of the thermostatic bar, 7.

In manufacturing the thermostatic bar, 7, the joint, 7c, will ordinarily be brazed or hard soldered; but it will be found expedient to also put in a fastening, 9b, owing to the tendency that the difference in expansibility has to disrupt a brazed joint.

If this trap is properly constructed according to the disclosure heretofore given it will be found to be a thermostatic trap having an extremely wide range of capacity and great sensitiveness and is believed to be in this respect far superior to the type of thermostatic trap using expansible fluids to secure the desired range of operation.

It has another very desirable feature in that the valve, 6, tends to act as a check valve and will prevent cross flow where several traps are connected to several systems using steam and to a common discharge conduit.

A very wide variation in construction details may be had without departing from the spirit of this invention. For example, the thermostatic bar, 7, need not be straight or even approximately so, and it may be curved like a shepherd's crook with the end thereof tending to influence the valve, and it will be understood that this disclosure merely shows an operative way of building the trap and what is deemed to be new and desired to secure by Letters Patent, is—

1. In a steam trap, a receiving compartment and a discharge compartment and a voluntary valve between the two said compartments, and a thermostatic bar control for said valve, said valve being located in the discharge compartment, in combination with a discharge outlet for said discharge compartment having less capacity than said valve.

2. In a steam trap, a receiving compartment and a discharge compartment and a valve between the two said compartments located in said discharge compartment, and a thermostatic bar control for the said valve built of diverse metals for the purpose indicated, and a restricted discharge opening for the discharge compartment having a discharge capacity less than the full capacity of the valve between the two said compartments.

3. In a steam trap, a receiving compartment and a discharge compartment, and a voluntary type valve between the said compartments, located within said discharge compartment and tending to close against said receiving compartment and a thermostatic bar element for the said valve made of diverse metals and tending to close the said valve under the influence of temperature, and a siphon pipe for said discharge chamber and a restricted outlet for said siphon pipe for the purpose specified.

4. In a steam trap, a receiving compartment and a discharge compartment and a check valve between the two said compartments and a thermostatic bar element tending to close the said check valve under the influence of temperature increase, the said thermostatic element utilizing the different expansibility of diverse metals to deflect a closure contact to influence the valve, in combination with a siphon pipe having a restricted bushing outlet for the purpose specified.

5. In a steam trap, a receiving compartment, a discharge compartment and a one-way valve between the two said compartments and a thermostatic bar element of the character described to effect control of said valve, and means for adjusting the said thermostatic bar element in combination with a siphon pipe having an inserted restricted outlet bushing member.

GEORGE F. McDOUGALL.